United States Patent
Meyer et al.

(10) Patent No.: US 11,338,794 B2
(45) Date of Patent: *May 24, 2022

(54) HYBRID VEHICLE LAUNCHING METHODS AND SYSTEM

(71) Applicant: Ford Global Technologies, LLC, Dearborn, MI (US)

(72) Inventors: Jason Meyer, Canton, MI (US); Kevin Ruybal, Canton, MI (US); Bhavesh Paradkar, Canton, MI (US); Todd Mccullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/391,225

(22) Filed: Apr. 22, 2019

(65) Prior Publication Data
US 2020/0331456 A1   Oct. 22, 2020

(51) Int. Cl.
| | |
|---|---|
| *B60W 20/19* | (2016.01) |
| *B60W 10/02* | (2006.01) |
| *B60W 10/08* | (2006.01) |
| *B60W 30/18* | (2012.01) |

(52) U.S. Cl.
CPC ............ *B60W 20/19* (2016.01); *B60W 10/02* (2013.01); *B60W 10/08* (2013.01); *B60W 30/18027* (2013.01); *B60W 2510/0291* (2013.01); *B60W 2510/0638* (2013.01); *B60W 2510/1015* (2013.01); *B60W 2520/10* (2013.01); *B60W 2540/10* (2013.01); *B60W 2552/15* (2020.02); *B60W 2710/021* (2013.01); *B60W 2710/083* (2013.01); *B60W 2720/30* (2013.01); *B60Y 2200/92* (2013.01)

(58) Field of Classification Search
CPC ...... B60W 20/19; B60W 10/02; B60W 10/08; B60W 30/18027; B60W 2552/15; B60W 2510/0291; B60W 2510/0638; B60W 2510/1015; B60W 2520/10; B60W 2540/10; B60W 2710/021; B60W 2710/083; B60W 2720/30; B60W 2200/92; B60Y 2200/92
See application file for complete search history.

(56) References Cited

U.S. PATENT DOCUMENTS

| | | | | |
|---|---|---|---|---|
| 8,224,544 B2 * | 7/2012 | Sah | ........................ | B60W 20/10 701/68 |
| 8,647,231 B2 * | 2/2014 | Soliman | ................. | B60W 20/20 477/5 |
| 8,706,337 B2 * | 4/2014 | Rauner | .................... | B60L 50/16 701/22 |

(Continued)

OTHER PUBLICATIONS

Meyer, J. et al., "Methods and System for Launching a Hybrid Vehicle," U.S. Appl. No. 16/391,208, filed Apr. 22, 2019, 48 pages.

*Primary Examiner* — Babar Sarwar
(74) *Attorney, Agent, or Firm* — David Kelley; McCoy Russell LLP

(57) ABSTRACT

Methods and systems are provided for operating a hybrid vehicle during launch conditions from rest. In one example, a threshold speed below which a clutch is closed during a vehicle launch is adjusted so that driver demand wheel torque is held constant for a constant accelerator pedal position until the clutch is closed.

20 Claims, 8 Drawing Sheets

(56) References Cited

U.S. PATENT DOCUMENTS

| | | | |
|---|---|---|---|
| 9,045,136 B2 | 6/2015 | Frank et al. | |
| 9,393,951 B2 | 7/2016 | Reed et al. | |
| 9,481,235 B1* | 11/2016 | Banshoya | B60W 10/02 |
| 9,616,884 B1* | 4/2017 | Cho | B60W 10/06 |
| 9,956,954 B2* | 5/2018 | Hata | B60W 50/032 |
| 9,987,917 B2* | 6/2018 | Oba | B60K 6/543 |
| 10,100,884 B2* | 10/2018 | Kim | F16D 48/06 |
| 2012/0083385 A1* | 4/2012 | Smith | B60K 6/442 |
| | | | 477/5 |
| 2013/0041562 A1* | 2/2013 | Mair | B60W 30/1882 |
| | | | 701/54 |
| 2014/0088805 A1* | 3/2014 | Tulpule | B60W 10/02 |
| | | | 701/22 |
| 2016/0016580 A1* | 1/2016 | Johri | B60W 10/06 |
| | | | 477/5 |
| 2016/0137182 A1* | 5/2016 | Johri | B60W 10/06 |
| | | | 701/22 |
| 2016/0375893 A1* | 12/2016 | Nefcy | B60W 10/08 |
| | | | 701/22 |
| 2017/0021824 A1* | 1/2017 | Johri | B60W 30/18145 |
| 2018/0118196 A1* | 5/2018 | Doering | F16H 61/47 |
| 2018/0244260 A1 | 8/2018 | Ruybal et al. | |
| 2018/0326988 A1* | 11/2018 | Lechlitner | B60K 6/442 |
| 2020/0331456 A1* | 10/2020 | Meyer | B60K 6/48 |

\* cited by examiner

HYBRID VEHICLE LAUNCHING METHODS AND SYSTEM

FIELD

The present description relates generally to methods and systems for launching a hybrid vehicle from a rest condition. The methods and systems may be particularly useful for hybrid vehicles that include a transmission clutch.

BACKGROUND/SUMMARY

A hybrid vehicle may start from a state or rest via power output from an electric machine. Once driver demand reaches a threshold level a transmission clutch may be closed so that additional power to propel the vehicle may be provided via an internal combustion engine. However, closing the transmission clutch may cause a driveline torque disturbance that may be noticeable to occupants of a vehicle. The driveline torque disturbance may be related to a torque capacity of the transmission clutch. The transmission clutch torque capacity may not always be consistent when applying a threshold amount of force to close the transmission clutch. For example, if the transmission clutch is hot it may have more tendencies to slip. On the other hand, if the transmission clutch is cold, the clutch may have more tendencies to grab. The characteristics of the transmission clutch may not always be predictable and/or repeatable. Therefore, even if characteristics of the clutch are determined and stored to controller memory, driveline torque disturbances may still be observed during transmission clutch closing. Therefore, it may be desirable to provide a way of closing the transmission clutch during a vehicle launch such that the possibility of driveline torque disturbances may be reduced.

The inventors herein have recognized the above-mentioned issues and have developed a vehicle operating method, comprising: subdividing an accelerator pedal and vehicle speed map into at least three sections; adjusting a breakpoint in one of the at least three sections relative to vehicle speed; and generating a driver demand wheel torque that is constant via an electric machine for a constant accelerator pedal position at vehicle speeds lower than a vehicle speed of the breakpoint, and decreasing the driver demand wheel torque at vehicle speeds greater than the vehicle speed of the breakpoint.

By adjusting a breakpoint that shapes a driver demand wheel torque, it may be possible to provide the technical result of improved vehicle launches even during conditions when operating characteristics of a transmission clutch may not be known or repeatable. In particular, a constant driver demand wheel torque may be delivered via an electric machine while a transmission clutch is being closed so that overall driveline torque may change less rapidly when driver demand wheel torque is being provided via a combination of electric machine torque and torque that is delivered via a transmission clutch. The vehicle speeds at which constant driver demand wheel torque is provided may be adjusted to ensure that the transmission clutch engages before electric machine torque is reduced so that output of only one torque source may change at a time until the transmission clutch is closed. Accordingly, rates of torque change in the driveline may be reduced to smooth driveline torque delivery. As such, vehicle drivability may be improved.

The present description may provide several advantages. In particular, the approach may provide improved vehicle drivability when a transmission clutch is being closed in response to a driver demand wheel torque or a request for electric energy storage device charging. Further, the approach compensates for vehicle operating conditions so that vehicle drivability may be improved. In addition, the approach helps to ensure that driveline torque disturbances due to changes in torque source output may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
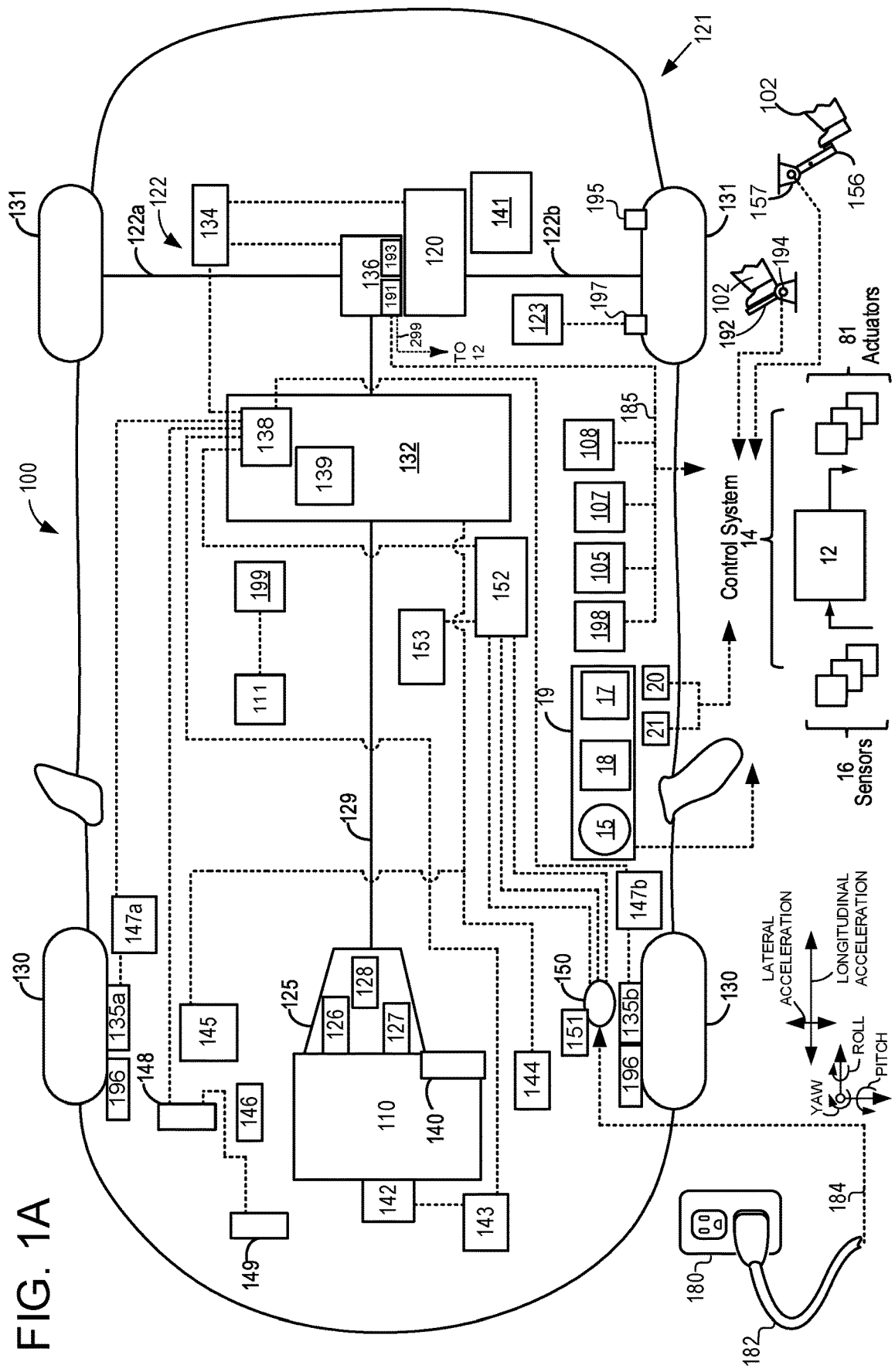
FIG. 1A is a schematic diagram of a hybrid vehicle driveline.
Figure 2:
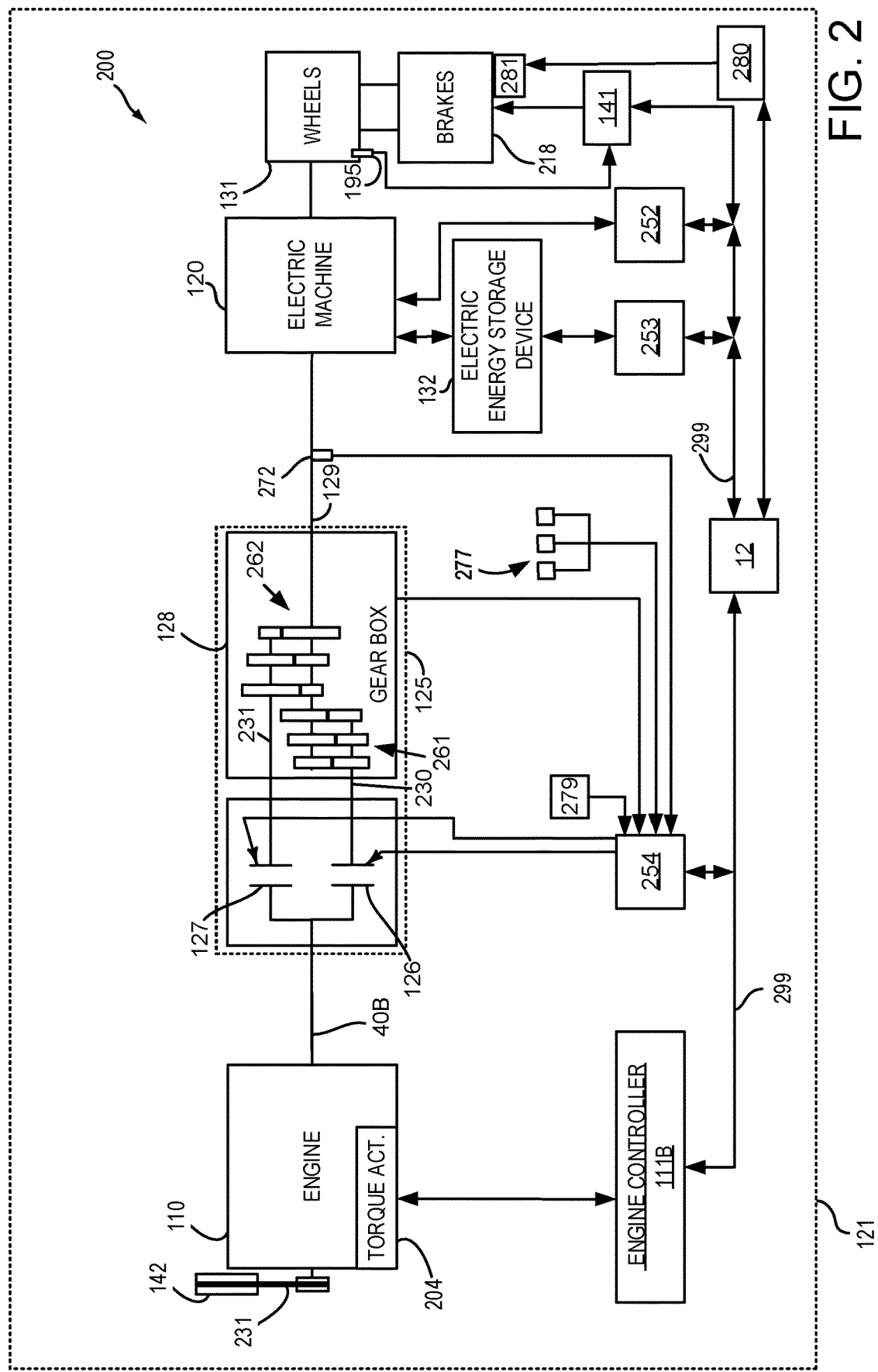
FIG. 2 is a schematic diagram of the hybrid vehicle driveline including controllers of various driveline components.
Figure 3A:
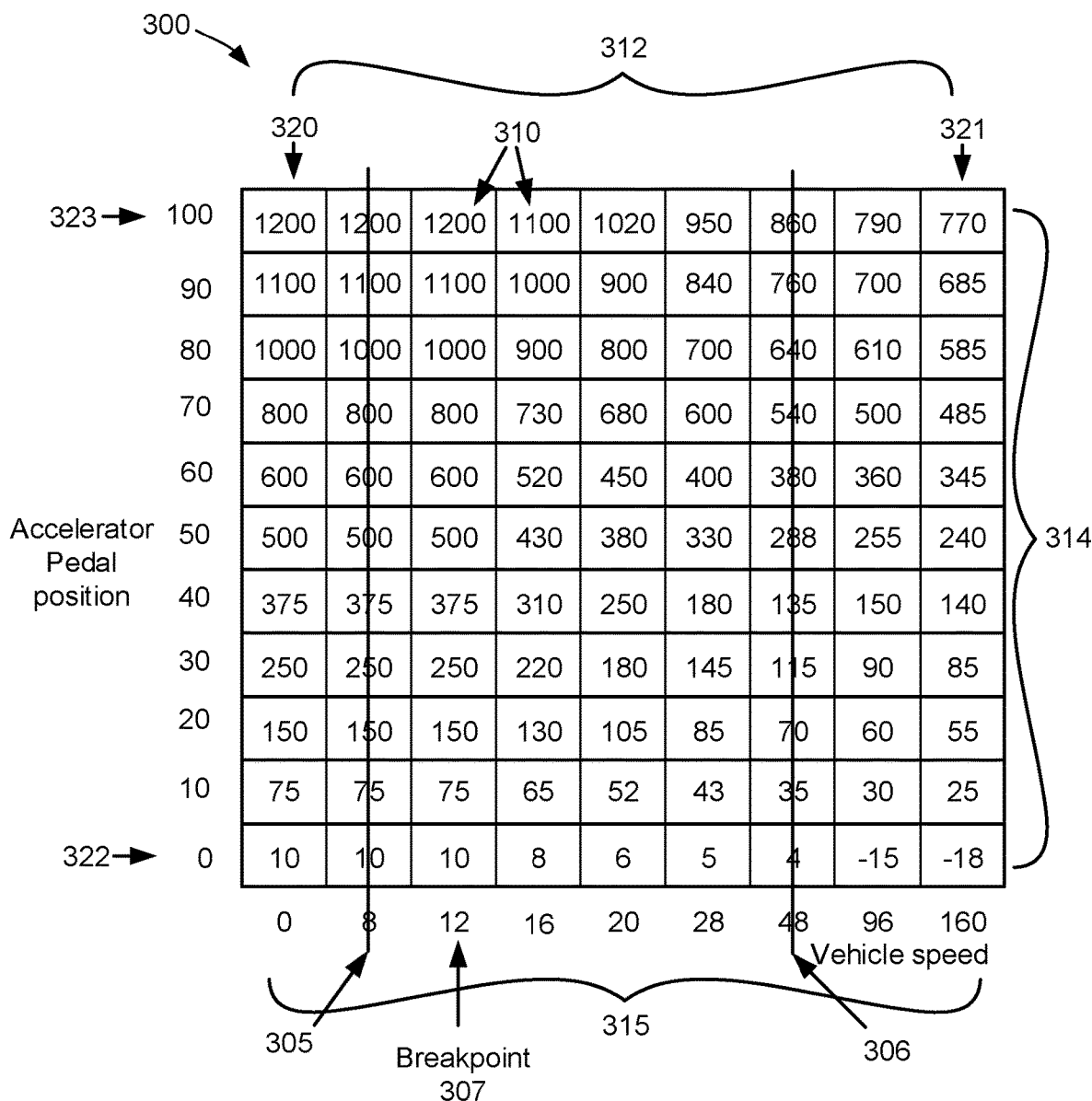
FIGS. 3A and 3B are example maps of accelerator pedal position versus vehicle speed maps for determining driver demand wheel torque.
Figure 3B:
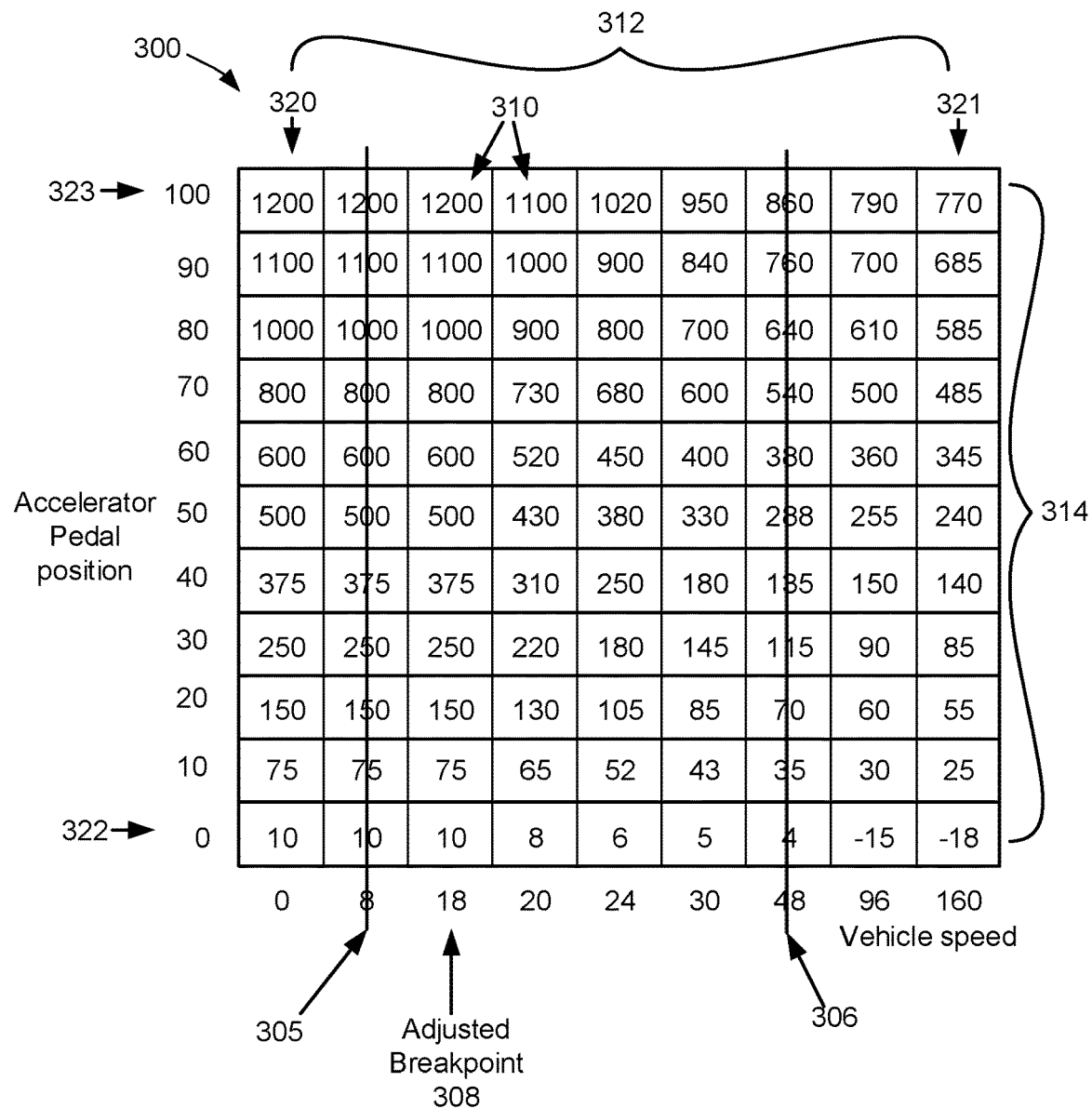
Figure 3C:
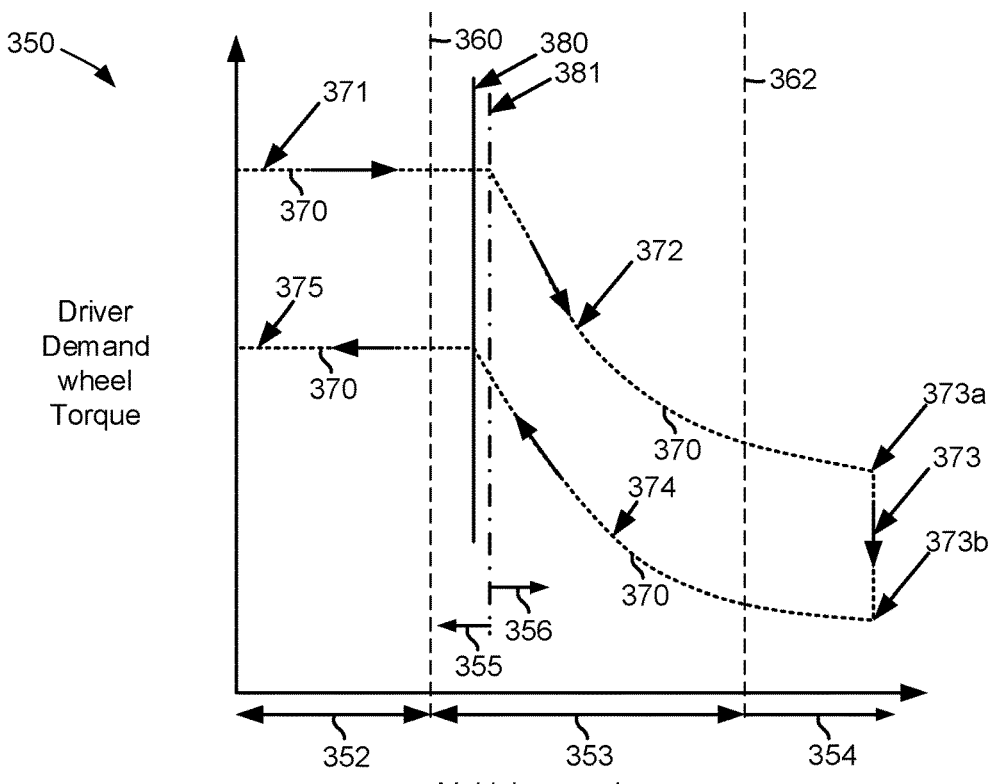
FIGS. 3C and 3D are plots of example driveline operating sequences according to the method of FIG. 4.
Figure 3D:
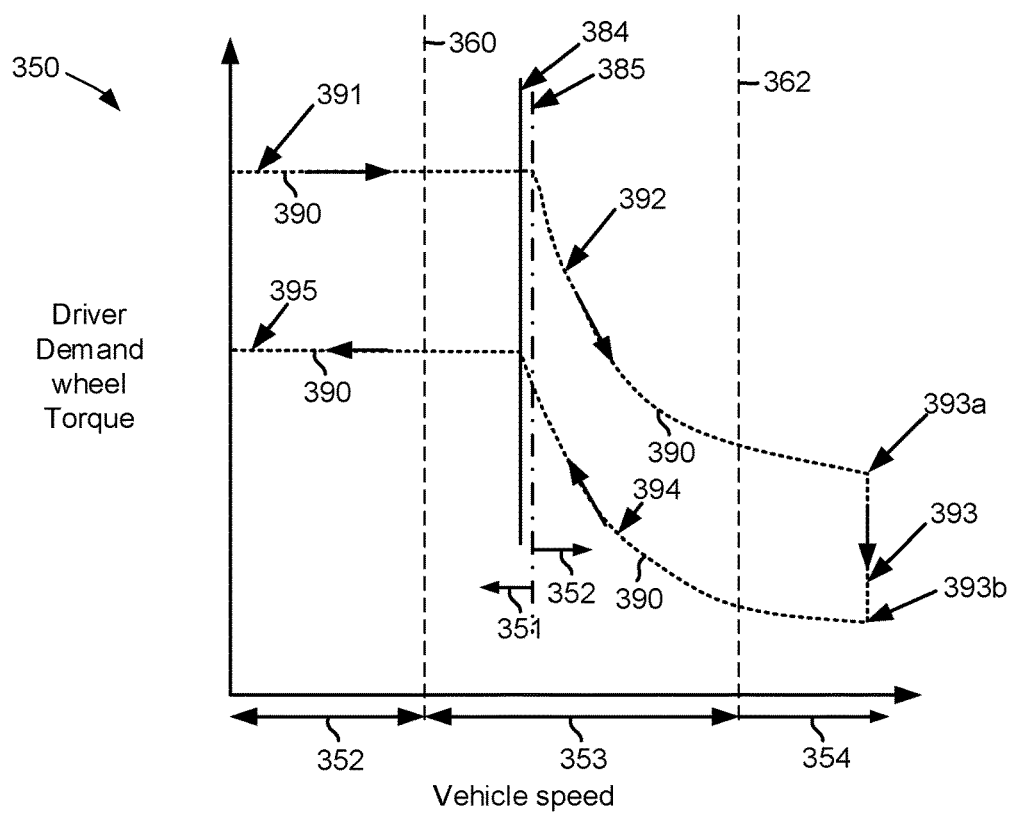
Figure 4:
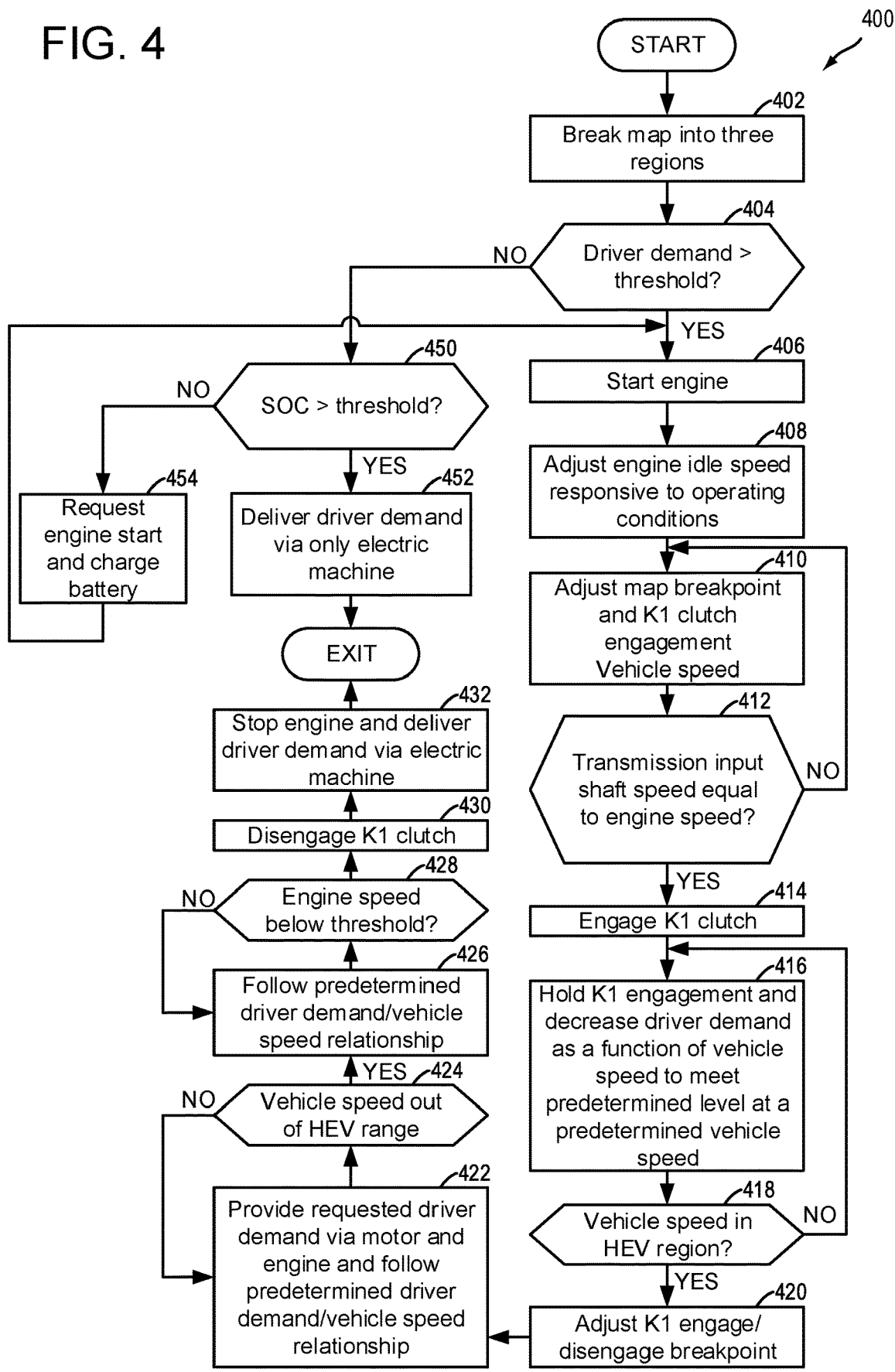
FIG. 4 shows an example method for operating a hybrid vehicle driveline during a vehicle launch from zero speed or rest.

The following description relates to systems and methods for operating a driveline of a hybrid vehicle. FIGS. 1A-2 show an example hybrid vehicle system that includes a driveline with an internal combustion engine, an integrated starter/generator, a dual clutch transmission, and an electric machine that may be operated in a regeneration mode to store a vehicle's kinetic as electrical energy. Example maps in the form of tables for determining driver demand wheel torque are shown in FIGS. 3A and 3B. Two example vehicle operating sequences for two different accelerator pedal progression profiles are shown in FIGS. 3C and 3D. FIG. 4 shows an example method for operating a vehicle driveline during a vehicle launch.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. In this example, front wheels 130 may be electrically driven and rear wheels 131 are driven electrically or via engine 110. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110 at a front side of the transmission 125a, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127. In another example, transmission 125 may be an automatic step ratio transmission and clutch 126 may be a launch clutch. Clutch 127 may be omitted when transmission 125 is a step ratio transmission. Clutch 126 and clutch 127 may be alternatively referred to as a K1 clutch.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Control system 14 may identify and/or control the amount of electrical energy stored at the energy storage device, which may be referred to as the state of charge (SOC).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Friction brakes 196 may be applied to slow front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include, wheel speed sensor(s) 195, ambient temperature/humidity sensor 198, etc. In some examples, sensors associated with engine 110, transmission 125, electric machine 120, etc., may communicate information to controller 12, regarding various states of engine, transmission, and motor operation, as will be discussed in further detail with regard to FIG. 1B and FIG. 2.

Dashboard 19 may include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, electric machines 135a and 135b, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle.

Figure 1B:
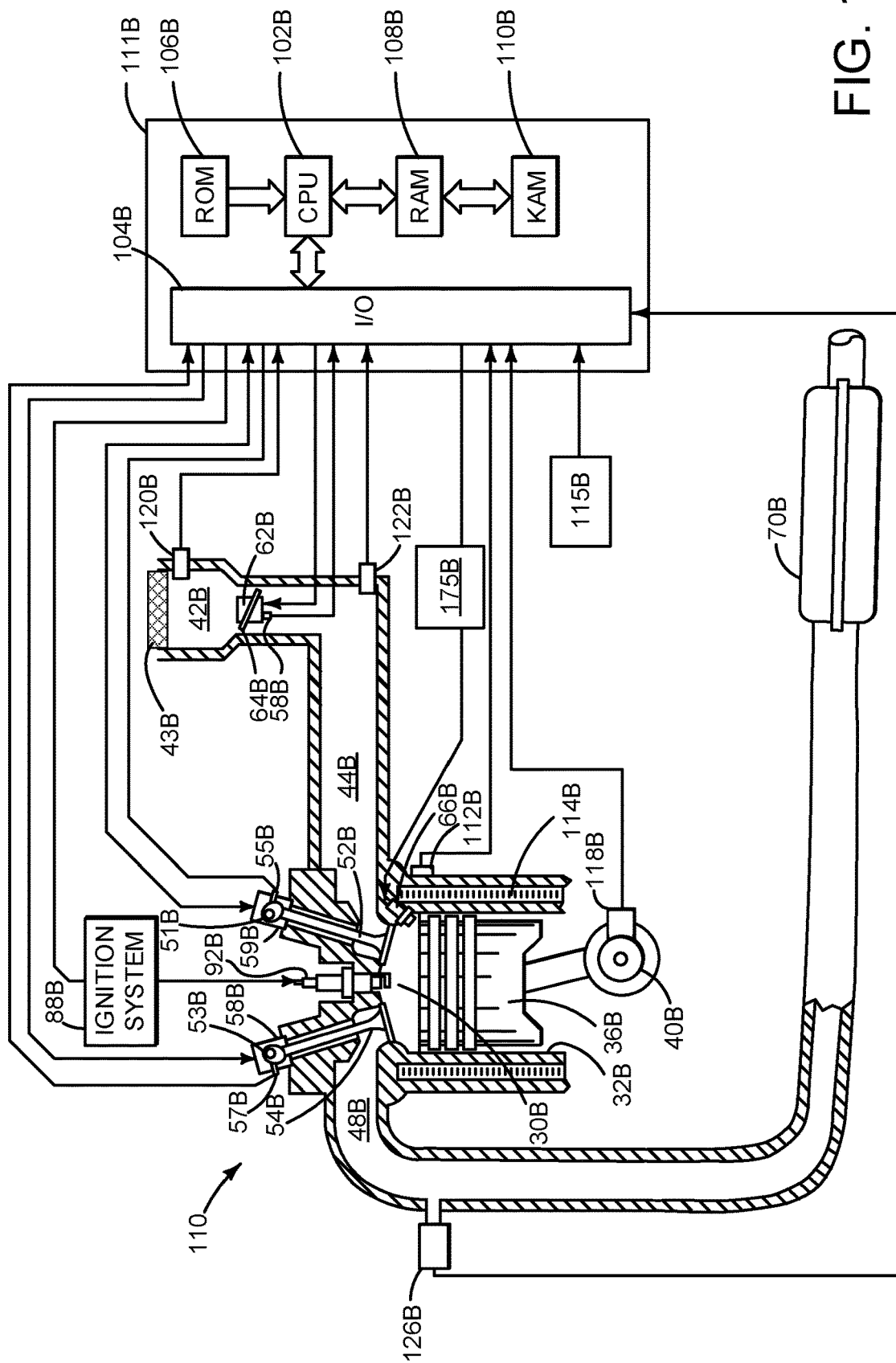
FIG. 1B is a sketch of an engine of the hybrid vehicle driveline.
Figure 1C:
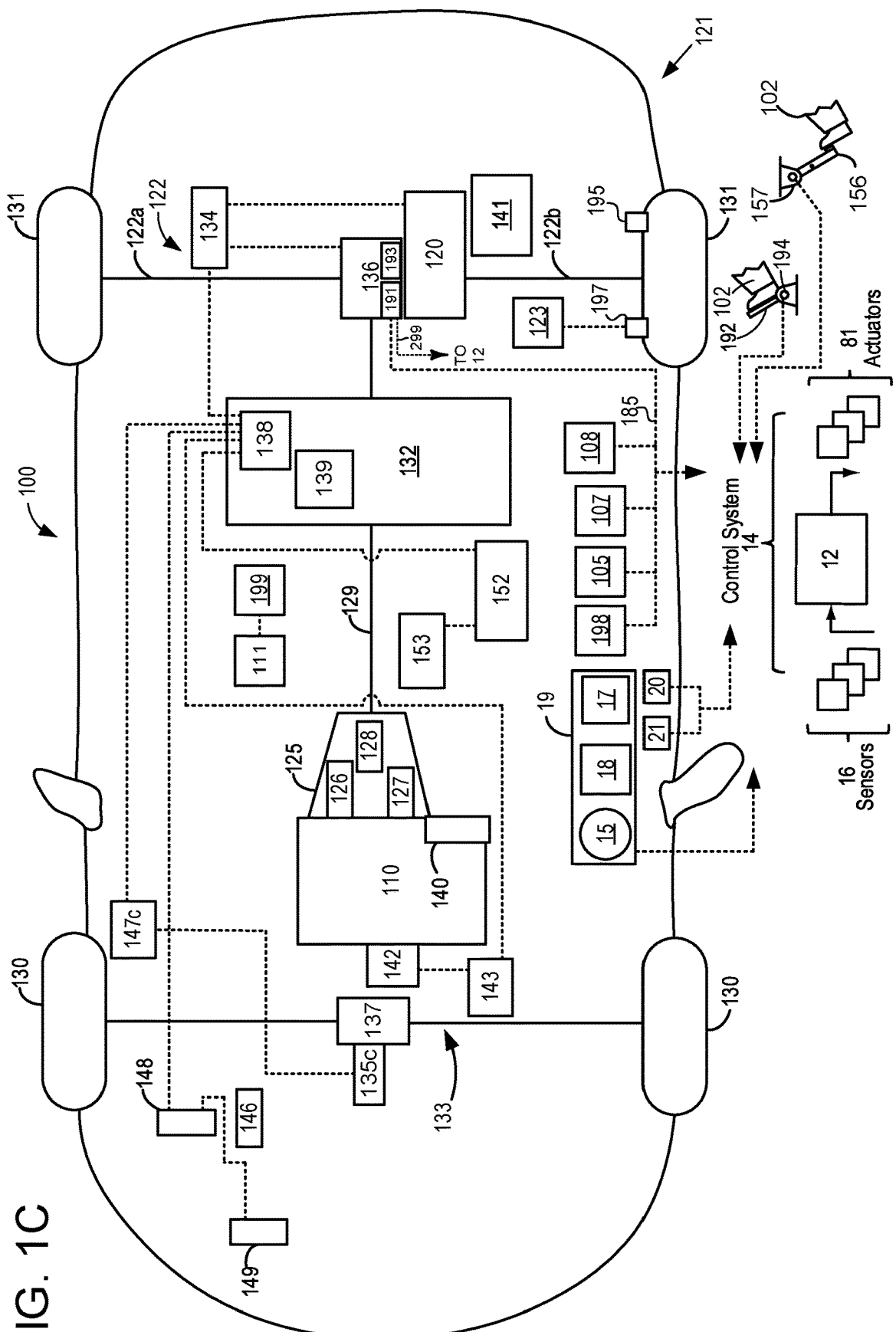
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display). Vehicle operating modes (e.g., economy, base, performance, etc.) may be selected via the human/machine interface 115B.

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130 via front drive unit 137, which may include a differential. In some examples, the electric machine 135c and the front drive unit 137 are considered part of front axle 133. Thus, front axle 133 may provide regenerative braking or torque to propel vehicle 121 in response to commands or requests from control system 14. Further, electric machine 135c may receive electrical power from, or provide electrical power to, electric energy storage device 132. Front axle 133 may be referred to as an independently driven axle. The other components shown in FIG. 1C may operate as previously described.

FIG. 2 is a block diagram of vehicle 121 including a powertrain or driveline 200. The powertrain of FIG. 2 includes engine 110 shown in FIG. 1A-1C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140 shown in FIG. 1A), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may selectively control torque transferred through odd gears 261 (e.g. first, third, fifth, and reverse) via first transmission input shaft 230, while another clutch, for example second clutch 127, may selectively control torque transferred through even gears 262 (e.g. second, fourth, and sixth) via second transmission input shaft 231. By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140 shown in FIG. 1A) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Thus, the system of FIGS. 1A-2 provides for a driveline system, comprising: an engine: a transmission including a clutch coupled to the internal combustion engine; an electric machine coupled to an axle; an accelerator pedal; and a controller including executable instructions stored in non-transitory memory to adjust a threshold speed, the threshold speed adjusted to a speed equal to or above an idle speed of the engine and less than or equal to a threshold engagement speed of the clutch, the threshold speed adjusted responsive to a vehicle operating mode, and engaging the clutch at a speed below the threshold speed during a vehicle launch. The driveline system further comprises additional executable instructions stored in non-transitory memory to generate a driver demand wheel torque that is constant in response to a constant position of the accelerator pedal during the vehicle launch before engaging the clutch. The driveline system further comprising additional executable instructions stored in non-transitory memory to reduce the driver demand wheel torque while the accelerator pedal is at the constant position after engaging the clutch. The driveline system further comprises additional executable instructions stored in non-transitory memory to increase the driver demand wheel torque in response to decelerating a vehicle after the launch while the accelerator pedal is at a constant position. The driveline system further comprises additional executable instructions stored in non-transitory memory to adjust the threshold speed responsive to road grade.

FIG. 3A shows an example accelerator pedal and vehicle speed map for determining driver demand wheel torque. The driver demand wheel torque values are shown with units of Newton-meters and the map may be referenced via accelerator pedal position and vehicle speed. Map 300 outputs driver demand wheel torque values that have been empirically determined via operating the vehicle on a dynamometer or road and gauging vehicle response against vehicle performance metrics. The vertical axis represents accelerator pedal position and the accelerator pedal position values are expressed as percent of full scale application of the accelerator pedal. The horizontal axis represents vehicle speed (e.g., kilometers/hour) and the vehicle speed increased from the left side of the map to the right side of the map. The values along the horizontal axis 315 (e.g., 0, 8, 12, 16, etc.) are the basis for referencing or indexing map 300 and they may be referred to as indices. Values of the indices may be adjusted to reference different cells in the map and change how the values in the cells of the map are interpolated. Values representing driver demand wheel torque are included for each cell in map 300. Two cells are indicated at 310. In this example, map 300 is shown in table form. Table rows are indicted at 314 and table columns are indicated at 312. Column 1 is indicated at 320 and column 9 is indicated at 321. Columns 2-8 follow the same numbering convention. Row 1 is indicated at 322 and row 11 is indicated at 323. Rows 2-10 follow the same numbering convention. It should be appreciated that the values in map 300 and the dimensions of map 300 are exemplary only and are not intended to be limiting. Driver demand wheel torque values for vehicle speeds and accelerator pedal positions that reside between the values listed may be determined via linear interpolation between cells in map 300. Thus, for an accelerator pedal position of 10% and a vehicle speed of 12 kilometers/hour, the driver demand wheel torque is 75 Newton-meters. And, for an accelerator pedal position or 10% and a vehicle speed of 14 kilometers/hour, the driver demand wheel torque is 70 Newton-meters ((75+65)/2=70 N-m) as determined via linear interpolation.

Vertical line 305 represents a vehicle speed at which a rotational speed of a transmission input shaft (e.g., 230 or 231) is equal to the engine's crankshaft rotational speed when the engine is at idle speed while the transmission is engaged in a predetermined gear (e.g., first gear). In this example, the vehicle speed at which engine rotational speed is equivalent to engine idle speed is 8 kilometers/hour; however, in other examples the vehicle speed may be higher or lower. The section of the map to the left of vertical line 305 may be referred to as an electric vehicle operating range (e.g., an operating range where the vehicle is propelled solely via the electric machine when battery state of charge is greater than a threshold).

Vertical line 306 represents a vehicle speed at which a rotational speed of a transmission input shaft (e.g., 230 or 231) is a maximum or a speed not to be exceeded for transmission clutch engagement while the vehicle is being launched and while the transmission is engaged in a predetermined gear (e.g., first gear). In this example, the maximum vehicle speed that the transmission clutch may be engaged during a vehicle launch that begins at a vehicle speed that is less than a threshold speed is 48 kilometers/ hour; however, in other examples the vehicle speed may be higher or lower. The section of the map to the left of vertical line 306 and to the right of vertical line 305 may be referred to as a transitional vehicle operating range (e.g., an operating range where the vehicle may be propelled solely via the electric machine, solely via the internal combustion engine, or via the engine and the electric machine). The section of the map to the right of vertical line 306 may be referred to as a hybrid electric vehicle range (e.g., an operating range where the internal combustion engine and the electric machine propel the vehicle or where the internal combustion engine solely propels the vehicle). It should be appreciated that the locations or vehicle speeds of vertical lines 305 and 306 in map 300 are exemplary only and are not intended to be limiting.

The row entries for each of columns 1-3 in map 300 all have the same values. For example, row 1, column 1 includes a value of 10. Row 1, column 2 includes a value of 10. Row 1, column 3 includes the same value 10. Thus, for a given constant accelerator pedal position, map 300 outputs a same driver demand wheel torque from vehicle speed zero to vehicle speed 12 kilometers/hour, thereafter the driver demand wheel torque is reduced as vehicle speed increases. Such a driver demand wheel torque may provide desirable vehicle drivability while permitting a smooth engagement of the transmission clutch during a vehicle launch.

At column 3, values in each of the rows begin to decrease to the right of column 3 for constant accelerator pedal inputs. Therefore, the vehicle speed at which the row entries (driver demand wheel torque values) begin to decrease (e.g., column 3) may be referred to as a breakpoint in map 300. The transmission clutch engagement vehicle speed (e.g., a vehicle speed at which a transmission clutch is engaged during a vehicle launch) may be anywhere between 8 and 12 kilometer/hour. The transmission clutch engagement vehicle speed may be required to be less than the vehicle speed at which the breakpoint occurs so that the transmission clutch may be engaged when electric machine output is constant. This may reduce driveline torque disturbances related to adjusting the electric machine output when the transmission clutch is being engaged. The breakpoint placement in map 300 in this example may be for baseline vehicle mode (e.g., lower performance mode). During a vehicle launch (e.g., a vehicle start from a low vehicle speed (e.g., zero) beginning solely under electric machine propulsion force and ending after a transmission clutch is engaged to couple the engine to the driveline), the transmission clutch (e.g., 126 or 127) may be engaged only at vehicle speeds that lie between the engine idle speed at 305 and the maximum clutch engagement speed 306 to provide smooth coupling between the engine and the driveline while the electric machine is propelling the vehicle.

Referring now to FIG. 3B, map 300 is shown again, but in this example the breakpoint has been adjusted so that driver demand is held constant up to a vehicle speed of 18 kilometers/hour. Map 300 is the same as map 300 shown in FIG. 3B, except as noted. Therefore, for the sake of brevity, the description of map 300 is omitted.

In this example, the breakpoint is adjusted as noted at 308. In particular, the vehicle speed that is associated with column three has been increased from a value of 12 to a value of 18. Further, the vehicle speeds associated with columns 4-6 have been adjusted. By adjusting the breakpoint, driver demand wheel torque may be held constant for a constant accelerator pedal position up to a speed of 18 kilometers/hour. Such an adjustment increases the vehicle speed at which the driver demand wheel torque begins to be reduced from a constant value for a constant accelerator pedal input. Thus, the transmission clutch may have an engagement vehicle speed anywhere in the range of between 8 and 18 kilometers/hour in this example. Increasing the engagement vehicle speed to 18 kilometers/hour may allow the engine to be at a higher speed before the transmission clutch is engages so that the engine's torque generating capacity may be increased as compared to if the transmission clutch is allowed to engage at 12 kilometers/hour. Consequently, map 300 in FIG. 3B may be the basis for generating constant driver demand wheel torques up to higher vehicle speeds. As such, map 300 in FIG. 3B may be the basis for determining driver demand wheel torques in a performance vehicle operating mode.

Referring now to FIG. 3C, an example vehicle operating sequence and an alternative way for determining driver demand wheel torque is shown. Driver demand wheel torque map 350 includes a vertical axis that represents driver demand wheel torque and driver demand wheel torque increases in the direction of the vertical axis arrow. The horizontal axis represents vehicle speed and vehicle speed increases in the direction of the horizontal axis arrow.

Curve 370 describes driver demand wheel torques for several accelerator pedal inputs and varying vehicle speeds. Vertical line 360 represents a vehicle speed at which a rotational speed of first transmission input shaft 230 is equal to the engine's crankshaft rotational speed when the engine is at idle speed while the transmission is engaged in its lowest gear (e.g., first gear). The vehicle speed at which a rotational speed of first transmission input shaft 230 is equal to the engine's crankshaft rotational speed when the engine is at idle speed while the transmission is engaged in its lowest gear may be equal to a base transmission clutch engagement vehicle speed and a base breakpoint vehicle speed, and the base transmission clutch engagement vehicle speed and the base breakpoint vehicle speed may be adjusted responsive to road grade, driveline noise and vibration levels, vehicle creep speed, and high engine idle speed for cold engine operation.

The base breakpoint vehicle speed may always be greater than the base transmission clutch engagement vehicle speed to ensure that the transmission clutch closes before the driver demand wheel torque begins to decrease from a constant level. Vertical line 362 represents a vehicle speed at which a rotational speed of a transmission input shaft (e.g., 230 or 231) is a maximum or a speed not to be exceeded for transmission clutch engagement while the vehicle is being launched and while the transmission is engaged in a predetermined gear (e.g., first gear). The section of map 350 to the left of vertical line 360 indicated at 352 may be referred to as an electric vehicle operating range (e.g., an operating range where the vehicle is propelled solely via the electric machine when battery state of charge is greater than a threshold). The section of the map to the left of vertical line 362 and to the right of vertical line 360 indicated at 353 may be referred to as a transitional vehicle operating range (e.g., an operating range where the vehicle may be propelled solely via the electric machine, solely via the internal combustion engine, or via the engine and the electric machine). The section of map 350 to the right of vertical line 362 indicated at 354 may be referred to as a hybrid electric vehicle range (e.g., an operating range where the internal combustion engine and the electric machine propel the vehicle or where the internal combustion engine solely propels the vehicle). It should be appreciated that the locations or vehicle speeds of vertical lines 360 and 362 in map 350 are exemplary only and are not intended to be limiting.

Vertical line 380 represents a transmission clutch engagement vehicle speed at which the transmission clutch is engaged. Vertical line 381 represents the vehicle speed where driver demand wheel torque values begin to decrease for a constant accelerator pedal input, which may be referred to as a breakpoint. The breakpoint 381 may be increased or decreased in vehicle speed as shown by arrows 355 and 356 to allow the transmission clutch engagement vehicle speed 380 to be increased or decreased. However, the transmission clutch engagement vehicle speed 380 may always kept at a vehicle speed that is less than the vehicle speed of the breakpoint 381 during a vehicle launch to improve transmission clutch closing and reduce driveline torque disturbances. In this example, the vehicle speed progression follows the arrows that are laid over curve 370.

In this example sequence, the driver demand begins at line segment 371. Accelerator pedal position is held constant at a first level for line segments 371 and 372. The vehicle speed increases from zero (at the vertical axis) speed while the transmission clutch is open and the electric machine (e.g., 120 or 135c) is propelling the vehicle. The vehicle exits the electric vehicle mode range and it enters the transitional range 353 as vehicle speed increases. The transmission clutch is engaged when the vehicle speed reaches the engagement vehicle speed 380 while the driver demand wheel torque is held constant. The transmission clutch fully closes and then the driver demand wheel torque begins to be reduced as shown in line segment 372. The vehicle speed continues to increase until vehicle speed exceeds the maximum transmission clutch vehicle engagement speed 362. The vehicle exits the transitional vehicle operating range and it enters the hybrid vehicle operating range. The vehicle's human driver (not shown) partially releases the accelerator pedal at 373a, where the driver demand wheel torque is lowered. The accelerator pedal position begins to be held constant again at 373b. Line segment 373 indicates the decline in driver demand wheel torque that is due to the partial release of the accelerator pedal.

The vehicle begins to decelerate since the driver demand wheel torque is lowered in response to partially releasing the accelerator pedal as indicated in line segment 374. The accelerator pedal position is held constant while the driver demand wheel torque begins to increase as indicated in line segment 374 since the vehicle speed is decreasing. In this example, the transmission clutch is fully opened at the vehicle speed of breakpoint 381, but in other examples, the transmission clutch may be fully opened when the one of the transmission input shaft speeds is equal to an engine idle speed when the transmission is engaged in a predetermined gear (e.g., first gear). The driver demand wheel torque is held constant as the vehicle speed decreases in line segment 375.

The driver demand wheel torque values in the driver demand wheel torque to vehicle speed relationship in the electric vehicle mode range may remain static as shown in FIGS. 3C and 3D, even when the vehicle breakpoint speed changes and the transmission clutch engagement vehicle speed changes. The driver demand wheel torque values in the driver demand wheel torque to vehicle speed relationship in the transition vehicle operating range may be adjusted as shown in FIGS. 3C and 3D to accommodate the vehicle breakpoint speed changes and the transmission clutch engagement vehicle speed changes. The driver demand wheel torque values in the driver demand wheel torque to vehicle speed relationship in the hybrid vehicle operating range mode range may remain static as shown in FIGS. 3C and 3D, even when the vehicle breakpoint speed changes and the transmission clutch engagement vehicle speed changes.

Referring now to FIG. 3D, a second example of the way for determining driver demand wheel torque according to the method described in FIG. 3C is shown. The axis and vertical lines 360 and 362 shown in FIG. 3D are the same as those shown in FIG. 3C. Therefore, for the sake of brevity they will not be described again. In addition, the driver demand wheel torque scaling and vehicle speed scaling shown in FIG. 3D are equal to that which is shown in FIG. 3C so that the differences may be visually recognizable.

In this example, the transmission clutch engagement vehicle speed 384 has been increased as compared to the transmission clutch engagement speed 380 shown in FIG. 3C. Further, the breakpoint 385 has been increased to a higher vehicle speed in FIG. 3D as compared to the vehicle speed shown in FIG. 3C. Vertical line 381 represents the vehicle speed where driver demand wheel torque values begin to decrease for a constant accelerator pedal input, which may be referred to as a breakpoint. The breakpoint 385 occurs at a higher vehicle speed than the vehicle speed at which breakpoint 381 of FIG. 3C occurs. The breakpoint 385 may be increased in response to a vehicle operating mode change (e.g., from base operating mode to performance operating mode). By increasing the vehicle speed at which breakpoint 385 is located, the transmission clutch engagement speed 384 may be increased so that the engine is at a speed where the engine may produce additional torque to respond to increasing driver demands. As such, the engine may be more suited for operating at high loads after the transmission clutch engagement when the transmission clutch is engaged at higher vehicle speeds.

In this example sequence, the driver demand begins at line segment 391. Accelerator pedal position is held constant at a second level (e.g., a higher level than the first level described in FIG. 3C) for line segments 391 and 392. The driver demand wheel torque and accelerator pedal position corresponding to line segments 391 and 392 is the same as shown in line segments 371 and 372 shown in FIG. 3C. The vehicle speed increases from zero (at the vertical axis) speed while the transmission clutch is open. The vehicle exits the electric vehicle mode range and it enters the transitional range 353 as vehicle speed increases. The transmission clutch is engaged when the vehicle speed reaches the engagement speed 384 while the driver demand wheel torque is held constant. The transmission clutch fully closes and then the driver demand wheel torque begins to be reduced as shown in line segment 392. The vehicle speed continues to increase until vehicle speed exceeds the maximum transmission clutch vehicle engagement speed 362. The vehicle exits the transitional vehicle operating range and it enters the hybrid vehicle operating range. The vehicle's human driver (not shown) partially releases the accelerator pedal at 393a, where the driver demand wheel torque is lowered. The accelerator pedal position begins to be held constant again at 393b. Line segment 393 indicates the decline in driver demand wheel torque that is due to the partial release of the accelerator pedal.

The vehicle begins to decelerate since the driver demand wheel torque is lowered in response to partially releasing the accelerator pedal as indicated in line segment 394. The accelerator pedal position is held constant while the driver demand wheel torque begins to increase as indicated in line segment 394 since the vehicle speed is decreasing. In this example, the transmission clutch is fully opened at the vehicle speed of breakpoint 385, but in other examples, the transmission clutch may be fully opened when the one of the transmission input shaft speeds is equal to an engine idle speed when the transmission is engaged in a predetermined gear (e.g., first gear). The driver demand wheel torque is held constant as the vehicle speed decreases in line segment 395.

Thus, in a first vehicle operating mode, driver demand wheel torque may be held constant at vehicle speeds just below a first breakpoint for a first constant accelerator pedal position. The transmission clutch may be engaged at a vehicle speed that is below the vehicle speed of the first breakpoint. In a second vehicle operating mode, driver demand wheel torque may be held constant at vehicle speeds just below a second breakpoint for the first constant accelerator pedal position. Further, the transmission clutch may be engaged at a vehicle speed that is below the vehicle speed of the second breakpoint. By maintaining the constant driver demand wheel torque until after the transmission clutch engagement speed is reached, it may be possible to achieve the technical result of reduced driveline torque disturbances.

Referring now to FIG. 4, an example method for operating a hybrid driveline to improve driveline efficiency via regeneration is shown. The method of FIG. 4 may be incorporated into and may cooperate with the system of FIGS. 1A-2. Further, at least portions of the method of FIG. 4 may be incorporated as executable instructions stored in non-transitory memory while other portions of the method may be performed via a controller transforming operating states of devices and actuators in the physical world.

At 402, method 400 breaks up a vehicle map into three or more regions. In one example, the map may be a map that outputs driver demand wheel torque in response to accelerator pedal position and vehicle speed as shown in FIG. 3A. The map may be divided into sections as shown in FIGS. 3A and 3B.

In another example, one or more maps that output driver demand values for a constant accelerator pedal position as a function of vehicle speed as shown in FIG. 3C may be divided into three or more sections. The maps may be divided into sections as shown in FIGS. 3C and 3D.

Method 400 proceeds to 404.

At 404, method 400 judges if driver demand wheel torque is greater than a threshold torque. Further, method 400 may require that the vehicle is being launched. The threshold torque may be adjusted for vehicle operating conditions including but not limited to battery state of charge, ambient temperature, vehicle speed, and engine temperature. Driver demand wheel torque may be determined via accelerator pedal position and vehicle speed as shown in FIGS. 3A and 3C. Method 400 may judge if the vehicle is being launched based on vehicle speed and which propulsion source is propelling the vehicle. If method 400 judges that driver demand wheel torque is greater than a threshold, then the answer is yes and method 400 proceeds to 406. Otherwise, the answer is no and method 400 proceeds to 450. Alternatively, if method 400 judges that driver demand wheel torque is greater than a threshold and the vehicle is launching, then the answer is yes and method 400 proceeds to 406. Otherwise, the answer is no and method 400 proceeds to 450.

At 450, method 400 judges if the battery state of charge (SOC) is greater than a threshold charge. The battery state of charge may be estimated from battery voltage and battery current. If method 400 judges that battery state of charge is greater than a threshold, the answer is yes and method 400 proceeds to 452. Otherwise, the answer is no and method 400 proceeds to 454.

At 454, method 400 request an engine start to charge the battery. Method 400 returns to 406 after requesting the engine start.

At 452, method 400 delivers the driver demand wheel torque solely via the electric machine (e.g., 120 or 135c). The engine is stopped and not rotating. Further, spark and fuel are not supplied to the engine. Method 400 proceeds to exit.

At 406, method 400 starts the engine. Method 400 starts the engine via a starter and the engine is accelerated to its idle speed. The engine is started via supplying spark and fuel to the engine. If the engine is a diesel engine, fuel may be supplied to the engine without spark being supplied to the engine. Method 400 proceeds to 408.

At 408, method 400 adjusts the engine idle speed responsive to vehicle operating conditions. Engine idle speed may be a first speed (e.g., 800 RPM) when engine temperature is above a threshold temperature and engine idle speed may be a second speed (e.g., 900 RPM) when engine temperature is less than the threshold temperature. Further, the engine idle speed may be adjusted responsive to the road grade. For example, engine idle speed may be a first speed (e.g., 800 RPM) when road grade is zero and engine idle speed may be a second speed (e.g., 900 RPM) when the road grade is greater than a threshold (e.g., 3% grade). By increasing the engine idle speed as a function of road grade, it may be possible to operate the engine at a speed where the engine torque output is suitable to maintain vehicle creep speed on a grade. Method 400 proceeds to 410 after adjusting engine idle speed.

At 410, method 400 adjusts the map breakpoint and the transmission clutch engagement vehicle speed. In one example, the breakpoint of the map is a vehicle speed at which driver demand wheel torque values in the map begin to decline from constant values as shown in FIGS. 3A and 3C. The vehicle speed at which the breakpoint occurs may be adjusted responsive to vehicle operating conditions such as road grade, driveline noise and vibration levels, vehicle creep speed (e.g., a speed at which a vehicle moves on flat ground when the vehicle is engaged in first gear and the accelerator pedal is not applied), and high engine idle speed for cold engine operation. For example, the vehicle speed at which the breakpoint occurs may be increased as road grade increases, increased as high engine idle speed increases, increased for driveline noise and vibration, and increased during conditions where vehicle creep speed is increased. By increasing the vehicle speed at which the breakpoint occurs, driver demand wheel torque may be held at a constant level for a constant accelerator pedal position while operating at higher engine speeds and higher vehicle speeds so that the torque capacity of the engine may be increased. The vehicle speed at which the breakpoint occurs may be adjusted via adjusting values of indices of the MAP as shown in FIGS. 3A and 3B. For example, values of selected indices may be increased to increase the vehicle speed at which the breakpoint occurs as shown in FIGS. 3A and 3B. Similarly, the vehicle speed at which the breakpoint occurs may be decreased as road grade decreases, decreased as high engine idle speed decreases, decreased for reduced driveline noise and vibration, and decreased during conditions where vehicle creep speed is decreased. By decreasing the vehicle speed at which the breakpoint occurs, the engine may be operable at lower speeds, which may reduce fuel consumption.

The transmission clutch engagement vehicle speed may also be adjusted responsive to vehicle operating conditions such as road grade, driveline noise and vibration levels, vehicle creep speed, and high engine idle speed for cold engine operation. In one example, the transmission clutch engagement vehicle speed may be the vehicle speed at which the breakpoint occurs minus an offset speed. This may ensure that the transmission clutch engagement occurs at a vehicle speed that is less than the vehicle speed at which the breakpoint occurs so that the transmission clutch may be fully engaged before the driver demand wheel torque begins to decrease. In other examples, the transmission clutch engagement vehicle speed may be adjusted independently from the vehicle speed at which the breakpoint occurs and responsive to road grade, driveline noise and vibration levels, vehicle creep speed, and high engine idle speed for cold engine operation. For example, a base transmission clutch engagement vehicle speed may be increased or decreased responsive to road grade, driveline noise and vibration levels, vehicle creep speed, and high engine idle speed for cold engine operation. In particular, the base transmission clutch engagement vehicle speed may be increased or decreased as a function of road grade, driveline noise and vibration levels, vehicle creep speed, and high engine idle speed for cold engine operation.

Alternatively, as shown in FIGS. 3C and 3D, a base transmission clutch engagement speed may be adjusted responsive to road grade, driveline noise and vibration levels, vehicle creep speed, and high engine idle speed for cold engine operation. Further, a vehicle speed at which a breakpoint occurs may be adjusted responsive to road grade, driveline noise and vibration levels, vehicle creep speed, and high engine idle speed for cold engine operation. Values in a driver demand wheel torque to vehicle speed relationship may be adjusted so that driver demand wheel torque declines once the vehicle speed reaches the vehicle speed at which the breakpoint occurs. Once vehicle speed reaches the maximum speed for transmission clutch engagement, the values in the driver demand wheel torque to vehicle speed relationship may be permanent and not adjustable. Method 400 proceeds to 412 after the transmission clutch engagement vehicle speed and breakpoint have been adjusted.

At 412, method 400 judges if the present transmission input shaft rotational speed (e.g., 230 or 231), which may be coupled to an engaged gear, is equal to or within a threshold speed of a rotational speed of the engine crankshaft. If so, the answer is yes and method 400 proceeds to 414. Otherwise, the answer is no and method 400 returns to 410. In one example, the engine rotational speed is a rotational speed that is equal to a rotational speed of a transmission input shaft when the vehicle is at the transmission clutch engagement vehicle speed while the transmission is in a predetermined gear (e.g., first gear). In other examples, depending on vehicle operating conditions, the engine rotational speed may be an engine idle speed.

At 414, method 400 engages the transmission clutch (e.g., 230 or 231). By engaging the transmission clutch when transmission input shaft speed is near engine speed, it may be possible to engage the transmission clutch while reducing the possibility of driveline torque disturbances. Method 400 proceeds to 416.

At 416, method 400 maintains the transmission clutch fully closed and decreases driver demand wheel torque as vehicle speed increases (e.g., as shown in FIGS. 3A-3D). The driver demand wheel torque may follow predetermined values while the vehicle speed is increasing. Method 400 proceeds to 418.

At 418, method 400 judges if vehicle speed is presently within the hybrid vehicle speed range. If so, the answer is yes and method 400 proceeds to 420. If not, method 400 returns to 416. In addition, if vehicle speed is less than the electric vehicle operating range vehicle speed, then the transmission clutch may be disengaged and method 400 may return to 402.

At 420, method 400 may adjust the transmission clutch engagement vehicle speed and the breakpoint vehicle speed responsive to vehicle operating conditions. Method 400 may adjust the transmission clutch engagement vehicle speed and the breakpoint vehicle speed once the vehicle is in the hybrid vehicle operating range so that the driver demand wheel torque follows a desired trajectory when the accelerator pedal is eventually released. Method 400 proceeds to 422.

At 422, method 400 generates the requested driver demand wheel torque via the electric machine and the internal combustion engine. Method 400 may generate the requested driver demand wheel torque as described in FIGS. 3A and 3C. The fraction of the driver demand wheel torque that is provided by the engine may be based on vehicle operating conditions, such as vehicle speed, battery SOC, and driver demand wheel torque request. The remainder of the driver demand wheel torque that is not provided by the engine may be provided via the electric machine. Method 400 proceeds to 424.

At 424, method 400 judges if vehicle speed is out of the hybrid vehicle operating mode vehicle speed range. If so, the answer is yes and method 400 proceeds to 426. Otherwise, the answer is no and method 400 returns to 422.

At 426, method 400 generates driver demand wheel torque according to predetermined driver demand wheel torque versus vehicle speed relationships (e.g., FIG. 3C) or according to a predetermined accelerator pedal position versus vehicle speed relationship (e.g., FIG. 3A). The driver demand wheel torque is generated by the engine and the electric machine or solely via the engine. Method 400 proceeds to 428.

At 428, method 400 judges if vehicle speed is less than a threshold speed (e.g., 305 in FIG. 3A or 360 in FIG. 3C. If method 400 judges that vehicle speed is less than the threshold speed, the answer is yes and method 400 proceeds to 430. Otherwise, the answer is no and method 400 returns to 426. Further, if vehicle speed increases to a vehicle speed in the hybrid vehicle operating range, method 400 may return to 422.

At 430, method 400 disengages and fully releases the transmission clutch. The transmission clutch is released to allow the engine to stop or continue running without stalling as vehicle speed decreases. Method 400 proceeds to 432.

At 432, method 400 stops rotation of the engine and delivers the requested driver demand wheel torque solely via the electric machine according to an accelerator pedal to vehicle speed relationship or according to a driver demand wheel torque to vehicle speed relationship. Method 400 proceeds to exit.

It should be noted that although the methods described herein mention driver demand wheel torque, a driver demand torque (e.g., an amount of torque requested at vehicle wheels by a human or autonomous driver) at any location along the driveline may be substituted for the driver demand wheel torque. Further, a more generic driver demand torque may be substituted for driver demand wheel torque.

In this way, driver demand wheel torque may be controlled to ensure a smoother engagement of a transmission clutch. In particular, the driver demand wheel torque may be held constant while the transmission clutch is being engaged to reduce the possibility of torque disturbances due to an electric machine that may occur simultaneously with changes in torque capacity of the transmission clutch.

Thus, the method of FIG. 4 provides for a vehicle operating method, comprising: subdividing an accelerator pedal and vehicle speed map into at least three sections; adjusting a breakpoint in one of the at least three sections relative to vehicle speed; and generating a driver demand wheel torque that is constant via an electric machine for a constant accelerator pedal position at vehicle speeds lower than a vehicle speed of the breakpoint, and decreasing the driver demand wheel torque at vehicle speeds greater than the vehicle speed of the breakpoint. The method includes where the breakpoint is an accelerator pedal position and vehicle speed where the driver demand wheel torque begins decreasing as vehicle speed increases. The method includes where adjusting the breakpoint includes adjusting a vehicle speed where the breakpoint occurs responsive to adjusting engine idle speed. The method includes where adjusting the breakpoint includes adjusting a vehicle speed where the breakpoint occurs responsive to a requested vehicle creep speed. The method includes where adjusting the breakpoint includes adjusting a vehicle speed where the breakpoint occurs responsive to road grade. The method further comprises engaging a clutch of a driveline in response to rotational speed of a transmission input shaft being substantially equal to engine crankshaft rotational speed. The method includes where the clutch is engaged at a vehicle speed that is less than a vehicle speed where the breakpoint is located in the accelerator pedal and vehicle speed map. The method includes where the constant accelerator pedal position is maintained as the driver demand wheel torque decreases.

The method of FIG. 4 also provides for a vehicle operating method, comprising: generating a driver demand wheel torque that is constant via an electric machine for vehicle speed less than a threshold speed responsive to a constant accelerator pedal position; decreasing the driver demand wheel torque for vehicle speeds greater than the threshold speed responsive to the constant accelerator pedal position; adjusting the threshold speed responsive to vehicle operating conditions; and commanding engagement of a driveline clutch only at vehicle speeds below the threshold speed. The method includes where the threshold speed is a speed between an engine idle speed and not to be exceeded clutch engagement speed. The method includes where adjusting the threshold includes adjusting the threshold responsive to a vehicle mode selection. The method includes where adjusting the threshold includes adjusting the threshold responsive to road grade. The method includes where adjusting the threshold includes adjusting the threshold responsive to a temperature of the clutch. The method includes where adjusting the threshold includes adjusting the threshold responsive to the driver demand wheel torque. The method further comprises commanding disengagement of the driveline clutch at an engine idle speed.

In another representation, the method of FIG. 4 provides for a vehicle operating method, comprising: generating a driver demand wheel torque that is constant via an electric machine for vehicle speed less than a threshold speed responsive to a constant accelerator pedal position; decreasing the driver demand wheel torque for vehicle speeds greater than the threshold speed responsive to the constant accelerator pedal position; adjusting a transmission clutch engagement vehicle speed responsive to vehicle operating conditions; and commanding engagement of a driveline clutch at the transmission clutch engagement vehicle speed, the transmission clutch engagement vehicle speed less than the threshold speed. The method includes where the transmission engagement vehicle speed is adjusted responsive to road grade. The method includes where the transmission engagement vehicle speed is adjusted responsive to engine idle speed. The method includes adjusting engine torque and electric machine torque to generate the driver demand wheel torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
subdividing an accelerator pedal and vehicle speed map into at least three sections;
adjusting a breakpoint in one of the at least three sections relative to vehicle speed; and
generating a driver demand wheel torque that is constant via an electric machine for a constant accelerator pedal position at vehicle speeds lower than a vehicle speed of the breakpoint, and decreasing the driver demand wheel torque at vehicle speeds greater than the vehicle speed of the breakpoint.

2. The method of claim 1, where the breakpoint is a vehicle speed where the driver demand wheel torque begins decreasing as vehicle speed increases.

3. The method of claim 1, where adjusting the breakpoint includes adjusting a vehicle speed of the breakpoint responsive to adjusting engine idle speed.

4. The method of claim 1, where adjusting the breakpoint includes adjusting a vehicle speed of the breakpoint responsive to a requested vehicle creep speed.

5. The method of claim 1, where adjusting the breakpoint includes adjusting a vehicle speed of the breakpoint responsive to road grade.

6. The method of claim 1, further comprising engaging a clutch of a driveline in response to rotational speed of a transmission input shaft being substantially equal to engine crankshaft rotational speed.

7. The method of claim 6, where the clutch is engaged at a vehicle speed that is less than a vehicle speed of the breakpoint in the accelerator pedal and the vehicle speed map.

8. The method of claim 1, where the constant accelerator pedal position is maintained as the driver demand wheel torque decreases.

9. A vehicle operating method, comprising:
generating a driver demand wheel torque that is constant via an electric machine for vehicle speed less than a threshold speed responsive to a constant accelerator pedal position;
decreasing the driver demand wheel torque for vehicle speeds greater than the threshold speed responsive to the constant accelerator pedal position;
adjusting the threshold speed responsive to vehicle operating conditions; and
commanding engagement of a driveline clutch only at vehicle speeds below the threshold speed.

10. The method of claim 9, where the threshold speed is a speed between an engine idle speed and not to be exceeded clutch engagement speed.

11. The method of claim 9, where adjusting the threshold includes adjusting the threshold responsive to a vehicle mode selection.

12. The method of claim 9, where adjusting the threshold includes adjusting the threshold responsive to road grade.

13. The method of claim 9, where adjusting the threshold includes adjusting the threshold responsive to a temperature of the clutch.

14. The method of claim 9, where adjusting the threshold includes adjusting the threshold responsive to the driver demand wheel torque.

15. The method of claim 9, further comprising commanding disengagement of the driveline clutch at an engine idle speed.

16. A driveline system, comprising:
an engine;
a transmission including a clutch coupled to the internal combustion engine;
an electric machine coupled to an axle;
an accelerator pedal; and
a controller including executable instructions stored in non-transitory memory to adjust a threshold speed, the threshold speed adjusted to a speed equal to or above an idle speed of the engine and less than or equal to a threshold engagement speed of the clutch, the threshold speed adjusted responsive to a vehicle operating mode, and engaging the clutch at a speed below the threshold speed during a vehicle launch.

17. The driveline system of claim 16, further comprising additional executable instructions stored in non-transitory memory to generate a driver demand wheel torque that is constant in response to a constant position of the accelerator pedal during the vehicle launch before engaging the clutch.

18. The driveline system of claim 17, further comprising additional executable instructions stored in non-transitory memory to reduce the driver demand wheel torque while the accelerator pedal is at the constant position after engaging the clutch.

19. The driveline system of claim 16, further comprising additional executable instructions stored in non-transitory memory to increase the driver demand wheel torque in response to decelerating a vehicle after the launch while the accelerator pedal is at a constant position.

20. The driveline system of claim 16, further comprising additional executable instructions stored in non-transitory memory to adjust the threshold speed responsive to road grade.

\* \* \* \* \*